July 4, 1967

D. F. OTHMER 3,329,583

METHOD FOR PRODUCING PURE WATER FROM SEA
WATER AND OTHER SOLUTIONS BY FLASH
VAPORIZATION AND CONDENSATION

Filed Jan. 18, 1963

INVENTOR.
DONALD F. OTHMER

July 4, 1967

D. F. OTHMER 3,329,583

METHOD FOR PRODUCING PURE WATER FROM SEA
WATER AND OTHER SOLUTIONS BY FLASH
VAPORIZATION AND CONDENSATION

Filed Jan. 18, 1963

INVENTOR.
DONALD F. OTHMER

United States Patent Office 3,329,583
Patented July 4, 1967

3,329,583
METHOD FOR PRODUCING PURE WATER FROM SEA WATER AND OTHER SOLUTIONS BY FLASH VAPORIZATION AND CONDENSATION
Donald F. Othmer, Coudersport, Pa.
(333 Jay St., Brooklyn, N.Y. 11201)
Filed Jan. 18, 1963, Ser. No. 252,473
6 Claims. (Cl. 203—10)

This invention relates to a method of multiple flash vaporization of dilute aqueous solution such as, particularly, sea water, while concentrating the solution and condensing the vapors either (a) to preheat the solution itself by indirect heat transfer, or (b) to reheat a cycling stream of fresh water by direct contact heat transfer and condensation therein.

More specifically, the invention refers to a process whereby the evaporation is done by a series of steps which may comprise, in addition to other steps of the usual multi-flash or the Vapor Reheat multi-flash evaporation, one or more of the following:

(a) Heating the dilute solution under pressure at least equal to its saturation pressure in a prime heater, by a submerged combustion of gaseous or liquid fuel;

(b) Evaporating a small amount of water simultaneously in the prime heater, to give steam, which is passed to what is later called a "Half-Stage" to heat the feed stream of dilute solution of the usual multi-flash system or the cycling stream of fresh water of the Vapor Reheat system to a higher temperature than that of the vapors of the highest temperature generated by the flash evaporation;

(c) By-passing of the prime heater by a small part of the dilute solution feed, and adding the part by-passed to the flash evaporation stage next lower in temperature to that of the stream—usually from the second to the tenth down from the stage of highest temperature, thereby permitting a recovery of most of the heat otherwise rejected and lost while operating at less than the optimum control of the process variables;

(d) If in a Vapor Reheat system, cooling the heated stream of fresh water condensate while preheating the raw sea water before it enters the prime heater by a direct contact liquid-liquid-liquid heat exchanger, or by a heat exchanger which uses a multiple flash evaporator for cooling. Some of these several processing novelties may increase without added heat cost the condensation in each stage, and add the condensation occurring in the Half-Stage to the amount of evaporation and the volume of the condensate which is withdrawn as pure water, the product of the system. Several or more of these processing steps, when combined in the novel manner of this invention, also give other advantages to the design and operation of the usual multi-flash or of the Vapor Reheat evaporation systems, as will be described hereinafter.

While standard apparatus and equipment may, in general, be used to give the advantages of the invention by suitable arrangements, interconnections, controls, and operations; in some cases some special accessory has been particularly effective in making possible the most effective use of the process of the invention.

The novel system comprises some improvements of the accessory apparatus and principally the improved process of heat and material flows used for the accomplishment of some or all of the following heat transfer operations;

(a) The heating and partial vaporization of raw sea water;

(b) Flash evaporation of the heated sea water in a multiplicity of stages;

(c) Condensation of vapors from the prime heater and from the multiple flash evaporation on the surface of the pre-heater tubes of the preheater when the usual multi-flash system is used, or directly on and in the condensate water recycled countercurrently, when the vapor reheat system is used.

While water is the usual solvent which is to be recovered from dilute solutions in a substantially pure form, other solvents may also be considered and recovered in the same manner. Also, sea water is used as a type of dilute aqueous solution, but the invention is not limited thereto or to other salt-containing or brackish waters, desired for potable use. Other aqueous solutions may also be used—either to produce pure water or to obtain concentrated solutions therefrom.

Solutions of inorganic, or of organic materials, or of both, may be concentrated by the methods to be described; and in handling these solutions somewhat different conditions may pertain even though the processing is the same. Thus, a solution of sulfite waste liquor which may be concentrated by this method would have different characteristics and a much higher elevation of boiling point (as defined later) than is encountered in the desalination of sea water. Even with solutions of common or other salt, when a concentrated brine is desired to make the salt itself as the product, rather than to make fresh water, the elevation of boiling point of the recycling liquor is important.

*Vapor Reheat process—General description*

More recently, there has now been developed a multiple-stage flash evaporation process wherein there are no metallic heat transfer surfaces used in condensing the vapors formed during the cooling of heated sea water accomplished in the multiple flash vaporizations. These vapors are used, not to preheat the stream of solution being handled, as in the usual multiple flash evaporator, but instead, the vaporous heat is used to reheat a cycling stream of colder fresh water condensate (sometimes called distillate) by direct contact of the vapors with and condensation of them on the surface of the liquid of the fresh water stream. There is a "ladder" of stages with hot sea water descending one side as it cools by flash vaporization in each stage; and colder pure water condensate is ascending the other side to be heated correspondingly by "flash" or "open" condensation. Vapors pass from hot brine to colder condensate across each stage; thus the metallic heat transfer surface for condensation is eliminated.

Inherently, the Vapor Reheat process is economic of heat, particularly with an optimization of the operating variables, as: (a) number of stages, (b) inlet top temperature of sea water feed, (c) ratio of fresh water to sea water fed to the ladder, and (d) ratio of amount of sea water recycled to the prime heater. Minimum heat requirements may be in the low range of 40 to 100 B.t.u. per pound of fresh water produced by this system, depending on the variables, even without the present improvements which reduce these requirements still lower, as noted hereinafter.

*Figures*

FIGURE 1 is a schematic flow sheet of the usual multi-flash evaporation system, with a Half-Stage. In this, as in the other figures, only a few stages are indicated. An actual number might be from 15 to 50. On the left side of each stage is a Vaporization-Cooling Zone; on the right side, a Condensation-Heating Zone. The pressure decreases from the high pressure P' of the top stage to the next lower pressure as P", to the next lower pressure P''', and so to P'''', and down to P$^v$, the lowest pressure.

Figure 1:
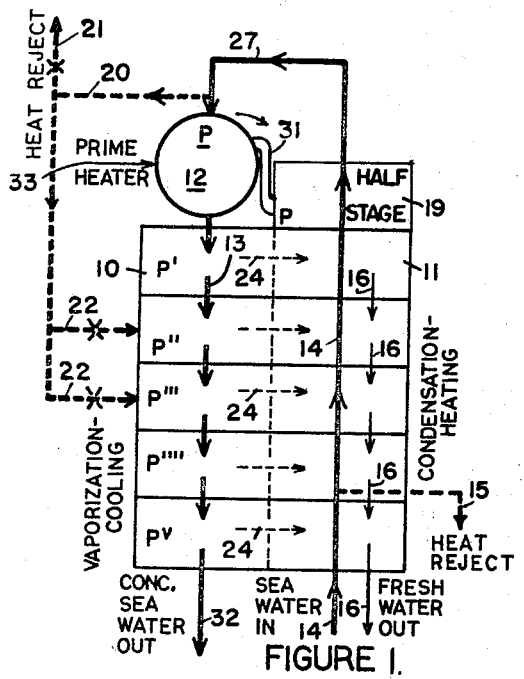

Considering FIGURE 1 in more detail: Raw Sea Water or brine enters at 14 under a pressure at least as high as its saturation pressure at the maximum temperature encountered in the system. It continues in the closed channel 14 through the Condensation-Heating Zones on the right side of the ladder 11, where it is being heated by condensing steam coming in the streams 24 from the left or Vaporizing-Cooling side 10 of each of the respective stages. The closed channel for brine being heated, 14, continues through what is called a Half-Stage 19, through line 27, to enter the Prime Heater 12, supplied with an external source of Heat, indicated as entering by line 33. In 12, the pressure P is higher than P' and the temperature is at, or near, the boiling point at pressure P, of the sea water or brine.

The brine passes from 12 to evaporating zones in the respective stages at successively lower pressure and temperature in each of the many successive stages, where it flashes to give water vapors flowing in open streams 24 to the cooling zones 11, where the water vapors are condensed on the surfaces of the closed channel 14. The stages are open between their evaporating zones 10 and their condensing zones 11, with provision only that the brine flowing in through lines 13 will not be in contact or mix with the fresh water condensate formed by condensation of the streams of steam 24. The path of the descending brine is indicated by the arrows 13, breaking at each stage, since there is no continuous enclosed conduit, as in the case of 14. The concentrate leaves at line 32. A recycle of part of this concentrate is common, made by a connection, not shown, across from 32 to the sea water inlet of 14.

The line 15 which may be at any stage from the bottom up to 30% of the total number of stages from the bottom, indicates the removal of some of the cold brine feed. This removal balances a difference in the capability of: (a) Vaporization-Cooling Side 10 to produce vapors 24 in the multiple flash evaporations; and (b) the Condensation-Heating Side 11, to condense these vapor streams 24 and thus to absorb the corresponding amount of heat. This discharge of brine to outside the system, through 15, removes the heat absorbed by it in the Condensing Zones which it has traversed, without being passed through the system to the Side 10. This indicates a HEAT REJECT from the system.

There is an alternate method of Heat Reject, which is a feature of this invention. This is the withdrawal of some of the heat of condensation absorbed in the Condensation-Reheating side of the ladder, by supplying less heated brine to the Prime Heater, and hence allowing less heat to be absorbed therein at the same high temperature, through the withdrawal of a stream through the line 20, and to remove it from the system by the valved line 21. A more efficient utilization of the heat of this stream withdrawn from 20 is to pass it through the alternate valved lines 22 to some stage below the top, usually from the 2nd to the 10th, or, desirably, where the temperature in the respective stage to which it is passed is at the approximate temperature, or just below the temperature of the liquid being withdrawn in the line 20. This allows the heat otherwise rejected in heated water withdrawn from the system, to be recovered efficiently at whatever temperature level it may be.

Another feature of this invention shown in FIGURE 1 is the so-called Half-Stage 19, which is supplied by vapors removed from the evaporation of brine in Prime Heater 12, through the line 31. The line 31 serves the same purpose as the stream of vapors 24 in the plurality of stages of the Multi-Flash Evaporating Ladder itself.

The Fresh Water-Out through line 16 is the sum of the condensate formed on the external walls of the channel 14 as it passes through the condensing zones for preheating the brine, while condensing the vapors which have been formed in the vaporizing zones.

Figure 2:
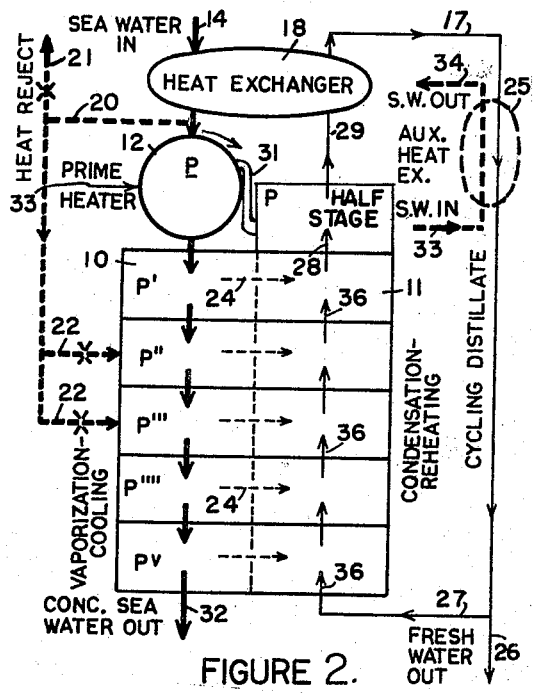
FIGURE 2 is a corresponding schematic flow sheet of the Vapor Reheat System similarly arranged and also having a Half-Stage.

FIGURE 2 shows a similar operation of the left side 10 of the Multi-flash ladder of stages, and with flows identical with those of FIGURE 1, starting with the preheated brine, in this case coming from the heat exchanger 18. The component parts are similar to those represented in FIGURE 1 and are numbered the same. The Prime Hetaer 12 again is preheating the feed brine up to substantially its boiling point under the pressure P existing therein. The prime heater 12 also evaporates some of the water from the dilute brine feed to supply vapors through line 31 to the Half-Stage 19, where the vapors at pressure P are condensed to heat the stream of condensate to a higher temperature than in the condensing zone of the last complete stage.

The highest pressure of evaporation, P, is in the prime heater; the brine, after some evaporation, therein, passes to stages of successively lower pressures, P', P'', P''', P'''', etc. In each stage there is a flash evaporation of some of the water of the brine entering each stage through the respective lines 13, and finally discharging as a concentrated sea water in line 32. Here again, heat may be rejected as one feature of this invention by withdrawing brine through the line 20 and thence 21, to waste; or more efficiently (and as described later) through the alternate lines 22 into stages of lower pressures, usually 2 to 10 stages, down from the stage of highest pressure, and desirably to enter a stage where the temperature of the brine is just below that of the temperature of the brine leaving the heat exchanger in the line 20.

In FIGURE 2, the resulting steam from the flash vaporizations, passes by the vapor streams 24, in the relatively open stages, to the condensing zones 11, on the right side, where it is condensed by a stream of colder fresh water, 36. This fresh water is former condensate, which is being cycled in open contact with the vapors, thereby causing condensation, since the fresh water is at a temperature below that of the vapor at the given pressure and hence below the boiling point of the fresh water stream at the particular pressure. This stream of fresh water condensate 36 is indicated by broken lines between the stages, since in each condensing zone it is in open flow, just as the brine in lines 13 is in open flow in the evaporating zone of each stage.

The fresh water stream 36 is heated in passing upwardly in counter-flow to that of the flash evaporating stream 13 of brine in the vaporizing zones of the respective stages; also, it is heated in the half stage 19 by the vapors from the prime heater 12 coming by line 31. The combined stream of recycling condensate liquid and fresh condensate former in this cycle enters the half stage through line 28 and is passed by line 29 to a heat exchanger 18. This temperature in 29 is the highest temperature the fresh water reaches in the system. The heat exchanger 18 may be of any type—shell and tube, liquid-liquid-liquid direct contact, or multi-flash condensation; and it reduces the high temperature of the fresh water in line 29 to a lower temperature, only a few degrees higher as it leaves 18 by line 17 from that of the Sea Water-In through line 14.

An auxiliary heat exchanger 25 may be used wherein there is circulated cold raw sea water entering by line 33 and out by line 34, to reduce the temperature of this stream of fresh water, by removal of heat. This corresponds to the additional condensation surface for cold sea water supplied in usual practice in the lower part of channel 14 in FIGURE 1, with corresponding Heat Reject through withdrawal of part of the stream by line 15. The fresh water produced discharges at 26, where a part of the cycle stream of condensate is withdrawn; and the balance is recycled to the condensation zones through 27.

Figure 3:
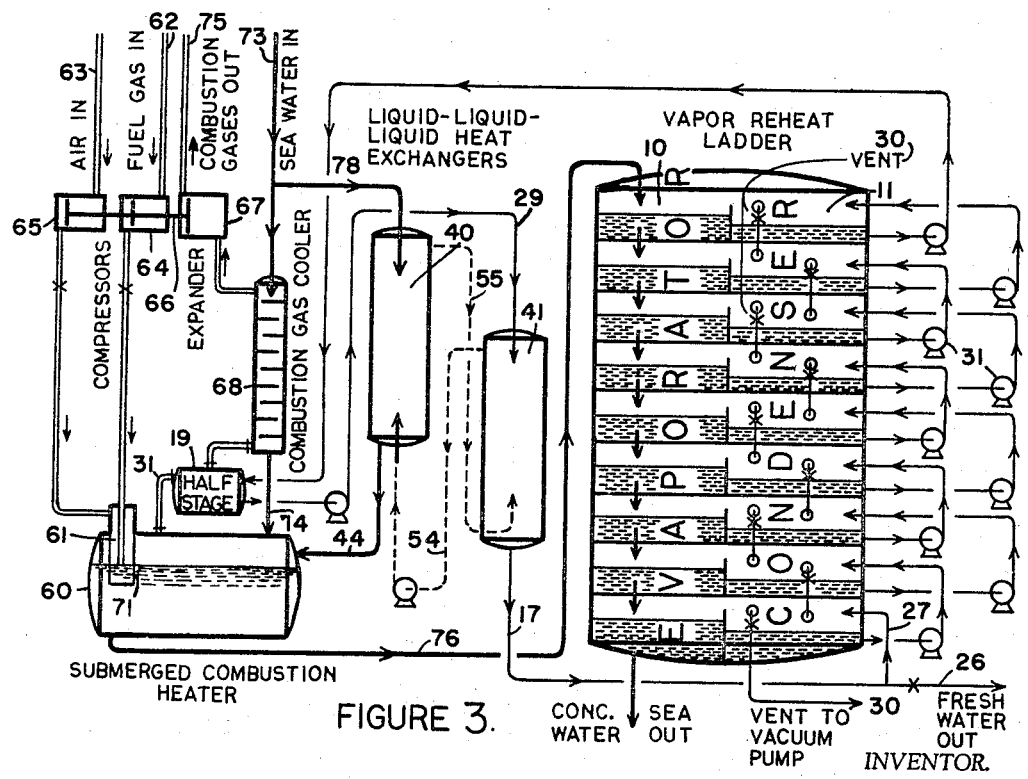
FIGURE 3 is a schematic flow sheet of the Vapor Reheat System with a Half-Stage. Heat is supplied by submerged combustion of a fuel gas; the combustion gases are cooled to preheat a part of the inlet sea water; and a liquid-liquid-liquid heat interchanger heats the inlet sea water in cooling the recycling condensate.

FIGURE 3 indicates the Vapor Reheat Ladder, with the same evaporation zone 10 in the left side of each stage and the same condensation zone 11 on the right side of the respective stage. Pumps 31 indicate the method of passage of the water condensate from each stage to the next higher pressure of the next higher stage. Also, a vent to a vacuum pump 30 indicates the removal of non-condensable gases from the condensing side of each stage. The respective vents 30 from each stage may be connected in parallel to the vacuum pump, or they may connect to the stage of next lower pressure, and from thence the non-condensible gases are passed in series to the final vents from the stage of lowest pressure. The pumps 31 and the vents 30 are not shown in FIGURES 1 and 2; and other usual accessories, valves, etc. are not shown in the diagrams.

FIGURE 3 diagrams one means of supplying external heat to the prime heater, of FIGURES 1 and 2, in this case by a submerged combustion heater, 60. This is supplied by air line 63, passing to a compressor 65, to a combustion zone 61; also fuel gas enters line 62 being compressed in the compressor 64, and is also supplied to the combustion zone 61 for combustion with the air below the surface of the brine 71, to supply the necessary external heat for the operation of the process. The cold sea water inlet at 73 is partially heated in going through a counter-current contactor 68, the combustion gas cooler. The combustion gases pass through an expansion in the cylinder 67, to be discharged to the line 75. Expansion energy from the combustion gases leaving is obtained in the expansion cylinder by driving a piston therein, connected to pistons on the compressor 64, for the inlet of fuel gas and to compressor 65 for the inlet of air. This, or similar system, allows the recovery of some of the mechanical energy necessary to compress the air and the fuel gas to the pressure of the prime heater.

The prime heater 60 receives the external heat from the combustion of the fuel gas, and heats the sea water supplied by the line 74 coming from the combustion gas cooler 68, to the high temperature of its discharge in line 76, on its way to the successive evaporating zones 10 of the Vapor Reheat Ladder.

The half-stage 19, comparable to that of FIGURE 2, serves to pass the heat from the prime heater, received as water vapors and combustion gases through line 31, by direct condensation on the stream of fresh water condensate supplied in open flow through line 28, thereby heating it to a higher temperature as it leaves in line 29.

The liquid-liquid-liquid heat exchanger has a cycling stream of a water-insoluble liquid, in this case with a lower density than that of water, which is cycling through the pipeline 54, to contact directly and countercurrently a descending stream of cold sea water entering from line 78 into the vessel 40. (This stream 78 is the larger part of the sea water feed of line 73, the smaller part having passed to 68, the combustion gas cooler.) Thereby, the heated stream of water-insoluble liquid is being cooled in 40, and discharges through line 55 to pass to the bottom of vessel 41. In the vessel 41, the cooled water-insoluble liquid rises through the hot cycling stream of fresh water condensate entering by line 29, thereby cooling this fresh water stream leaving by 17. Line 17 discharges, in part, to line 26 as Fresh-Water-Out, a major part of this stream is recycled through line 27, back to the condensing zone of the stage of lowest pressure in the vapor reheat ladder. Meanwhile, the water-insoluble liquid of line 55 absorbs the heat from the hot condensate stream in 29, while directly contacting it in vessel 41 of the heat exchanger; and the water-insoluble stream leaves by line 54 to continue its cycle.

The hot stream of condensate, heated to its highest temperature in the Half-Stage 19, thus gives up most of its added heat in the vessel 40 to the sea water entering in 78. This sea water is thus preheated to pass in line 44 to the prime heater 60, where it is heated along with the balance of the sea water coming by way of line 74.

*Multiple flash evaporation ladder with half stage*

FIGURE 1 diagrams the usual multiflash evaporation process on which has been superimposed what has been called the "Half-Stage," an essential feature of the present invention. Its function in production of an additional amount of distilled water without additional heat cost is described below.

The incoming seat water, under a pressure at least as high as the saturation pressure corresponding to the maximum temperature it encounters, passes through the heat transfer tubes, up the ladder of stages, to be heated by the vapors formed by the successive flash evaporations in the left or Evaporating-Cooling sides of the respective stages.

The Prime Heater, in this use of the Half Stage, is operated not only as a heater, but also as an ordinary evaporator. It supplies vapors at a higher temperature than that of the vapors from the top stage—which come from cooling the liquid leaving the Prime Heater. The vapors from the Prime Heater heat the condensate from the temperature leaving the top stage to within a reasonable approach temperature of the vapors themselves. This is done with a condenser Half-Stage, exactly like the condenser side of any of the stages of flash evaporation. It is superimposed on the ladder, as shown, and supplied with vapors from the evaporation in the Prime Heater of a small part of the hot sea water. In a usual multi-flash evaporator, the condensation is on a heat transfer surface; in the Vapor Reheat system, it would be by direct condensation on the cycling distillate.

The Half-Stage is supplied with vapors from a regular boiling evaporation. These vapors (neglecting boiling point elevation), are at the highest temperature to the liquid, which is not being cooled by their formation; and they can bring the temperature of the sea water feed up to the temperature of approach to these vapors. Contrariwise, a flash evaporation cools the liquid stream, thus gives vapors coming at a lower temperature than the highest liquid temperature (again neglecting boiling point elevation). Thus, the highest these vapors can heat the liquid, after considering the temperature of approach, is to some temperature between its temperature entering the condenser of the stage and the temperature of the heated and flashing liquid entering the stage. Herein there is a difference of the Half-Stage from the vaporization side of the full stage. A corollary is that the liquid being evaporated in the Prime Heater is, of course, not losing temperature, as is that in the flash vaporization of the usual stage, since heat comes from a prime source, not from cooling.

Comparing Multiflash Evaporation with and without the Half-Stage, it is apparent that the requirements of heat supplied to the Prime Heater will be the same for each system, since, in each case, it is the amount of heat required to heat the sea water from the temperature leaving the condenser side of the top stage to the temperature entering the flash part of the top stage. But in FIG. 1, describing one aspect of the present invention, the vapors formed in evaporating the sea water are condensed to give pure water; and this additional amount of product—pure water—is the advantage gained. Also, since this is at the highest temperature level, the flashing of this additional amount of pure water produces an increment of vapors and condensate in each stage down to the lowest, or a total advantage of increased product, considerably more than the condensate in the Half-Stage.

Exactly the same reasoning may be applied for the use of the Half-Stage superimposed on the Vapor-Reheat ladder, as in FIGURE 2. Here again, the amount of vapors condensed in this Half-Stage represents a net gain of pure water product to the system without any increase in the requirement of prime heat, i.e., that supplied from the outside. However, in FIG. 2, there is the reasonable assumption that the Heat Exchanger will absorb the available heat in the hot distillate at its temperature and pass it to the entering sea water to bring that within the same temperature of approach of the hot distillate as without the Half-Stage.

In the Vapor-Reheat system, the use of the Half-Stage increases the product and reduces the unit heat consumption by from 5% to 20%; and in the usual multiflash system, the advantage is 10 to 25%. The greatest improvements are always with the lesser number of stages.

Recovery of heat otherwise rejected

In the operation of a usual multi-flash evaporation system, the raw sea water stream is heated by the condensation of the vapors formed in the successive vaporizing-cooling compartments of the stages by the flashing of the sea water after it is sufficiently heated. The pre-heated sea water then passes through a Prime Heater which supplies heat to raise the temperature to the higher temperature necessary for the top stage flasher.

For a given system there would always be specified the number of stages and the top temperature—the highest available under the specifications available, also the lowest temperature—that of the sea water available. For heat economy, it is desirable to recover as much heat as possible from the discharge of concentrated sea water; i.e., to reduce its temperature as low as possible; and furthermore, to choose a recycle ratio of discharge sea water fed back into original sea water feed so as to give optimum operation and minimum heat cost. (Such a recycle is not shown on the flow sheets of the figures, but is commonly used.) All of the possible variables may not be independently specified, and still have an operable and balanced system.

Under some conditions of operation, it has been found that there may be a larger amount of sea water required to be passed through the condensation side of the ladder in order to condense the vapors, than can be utilized in the vaporization side. Thus, in FIG. 1, line 15 discharges a Heat Reject stream of sea water which has been heated in only a few of the stages of lowest temperature. Another way of noting the same effect is that there may be a lesser amount of heat present in the hot sea water leaving the top stage than will be supplied as vapors by this same quantity of sea water when it passes to the Prime Heater and the top stage of the Vapor Reheat ladder. This may be due to an imbalance of control of the several operating variables of a system of a given number of stages; i.e., the amount of sea water fed in at its given temperature, the amount of sea water recycled, if any, and the temperature of discharging the sea water from the Prime Heater. Only one value of each variable will give a balanced system.

In some cases, it is impossible to balance all of these operating variables under the most advantageous conditions of operation; however, it is always necessary to condense the fresh water vapors being formed and to add this heat to the inlet sea water stream. This may be done by increasing the feed of sea water to the system. If the excess heat develops, it becomes necessary to discharge some heat from the system through a discharge of some of the preheated sea water passing through the Condensation-Heating Side and before it passes to the Prime Heater and the top flash evaporation compartment. It has therefore been common practice to discharge a small amount of the heated sea water leaving the top stage Condenser-Heater before it goes to the Prime Heater. However, this prevents the unit being operated at its full duty, in which case the sea water recycled would be at a higher than desired temperature when re-entering the bottom stage along with original sea water.

This heat rejection hitherto found necessary represents a loss from the system which it has now been found possible to recover; at least in large part.

FIG. 1 shows, by a dotted line 20 by-passing the Prime Heater, a stream of sea water from the top of the Condensation-Heating side discharging through an exhaust valved line 21 entitled "Heat Reject." This allows an outflow of as much heated sea water as may be required to maintain a balance, from 2 to 5% would be usual, although in the case of an upset in operation, this might go up to 10% or even higher temporarily. The other branches 22 and 23 of this dotted connection are the preferable connections of the present invention. The Heat Reject valve 21 is closed; and a small amount of the sea water, preheated from the Condensation-Heating, is passed to by-pass the Prime Heater and the top of the ladder of stages. In this case, the stream is indicated as entering the Vaporization-Cooling side of the ladder at the second, or alternately the third chamber from the top. FIG. 1 is merely diagrammatic; and depending on the temperatures involved and the total number of flashers in the system, this inlet might desirably be made between the second to the tenth flasher from the top. (Also, FIG. 1 shows the alternate Heat Reject stream, larger in amount, often taken for the same reason from the sea water feed at a low number stage.)

By allowing a part of the sea water which has been pre-heated in the Condensing-Heating side of the ladder of stages to pass through this by-pass indicated by the dotted circuit in FIG. 1, through line 20 and either one of valved lines 22, the heat therein is obtained for further use at the highest temperature level for which it is available. Thus, the flash chamber to which it is added is that having the temperature next lower than the temperature of the sea water at that point. By having a header with valves to several possible connections (only two of which are shown in FIG. 1) the proper stage can be selected for inlet of a part of the liquid.

The fraction of the amount of sea water discharging may be desirably from 5 to 20% of the sea water entering, although usually it will not exceed 10%. This amount of the preheated stream of sea water is withdrawn, by-passing the Prime Heater and the top stage of the ladder of stages, and thence passed into the selected stage. The flashing takes place of this liquid along with the balance of the sea water from this stage successively downwardly on to the lowest stage wherein there is a withdrawal of the concentrated sea water. By proper control of the valve determining the amount of withdrawal of the by-passed stream, the system may be brought into a steady state, utilizing the heat supply to the maximum effectiveness. (Also, it has been found that the heat reject, by additional cooling in the lower stages, is made equally unnecessary for the new invention, which thus uses heat more effectively and has lower unit consumption than do standard systems.)

At first, the adjustment of the system through by-passing a stream of excess preheated sea water around the prime heater to the flashing compartment of a stage near the top will cause an additional amount of vaporous heat to be removed in the condenser-heater section on the right side; and another adjustment of the valve controlling this by-passed stream will have to be made to accommodate this. Subsequent minor adjustment enables the operation to come to the desired steady state.

The control of the amount of the by-passed sea water stream may be made partially or completely automatic by a combination of suitable thermostat valves, one controlling the discharge of the sea water before entering the prime heater, and others at the several inlet points to the ladder of stages. Manual selection is simple when the ladder of stages has a thermometer indicating the temperature of each stage, and the liquid by-passing the prime heater goes to the stage having the next lowest temperature. However, control of the amount of liquid flowing in this by-pass may well be done automatically. Thus, there may be selected automatically from its temperature, the proper entrance point of the stream by-passed around the prime heater and the top stage or stages. (Meanwhile, the temperature of the liquid leaving the prime heater is kept constant, while its amount fluctuates, since the by-passed liquid does not pass through the prime heater.)

In usual practice, the multi-flash units for desalination of sea water reject heat from the flash evaporation side to balance that which can be absorbed by the condensing side, in another way with, however, consequent loss of heat. Thus, a part of the entering sea water, after passing through the lowest temperature stages (lower right corner of FIG. 1) may be discharged to waste through line 15 without climbing more than 10 or 15% of the total number of stages in the ladder. A larger amount of sea water thus enters than is heated to the high temperature; and it only serves to condense the vapors from the lowest stages, as indicated by the stream shown by the dotted line, Heat Reject.

Similarly, in the use of multiple flash evaporation for concentration of brines, where the lowest stage is at atmospheric pressure, there often occurs an excess steam over that which can be utilized in preheating the feed. This steam, with its heat to be rejected, is allowed to vent to waste. In both cases, heat is lost, while in the present Recovery of Heat Otherwise Rejected, the full amount of heat in the brine before the prime heater is utilized at the highest temperature at which it is available, and practically no heat is wasted, even if the control of the ratio of recycle brine is relatively badly in error.

In the operation of the Vapor-Reheat system, there is similarly the difficulty of independently setting and controlling the several operating variables of the system. Thus, it is usually desirable to maintain the highest operating temperature for the brine entering the top flasher container, under whatever limitations there may be for this; also it is desirable to maintain the minimum possible temperature of the fresh water recycled to the bottom stage in order to secure the lowest operating temperature there for optimum amount of condensation. Furthermore, the ratio of recycle of distillate and of recycle of brine to brine fed are most important factors which may be independently controlled. (Normally, the temperature of approach in the heat exchanger may be assumed to be fixed if the heat exchanger is of adequate capacity for the system.) These four functions, (a) temperature of brine inlet in the top flasher, (b) temperature of fresh water inlet to the bottom chamber, (c) amount of recycle of distillate, and (d) amount of recycle of brine (not shown on flow sheets) cannot be fixed independently. Here again, as with the usual multi-flash system, it has been found desirable to utilize a similar system of balancing of variations of capacities for evaporation and condensation on the two sides of the system, without rejecting heat.

FIGURE 2 shows a diagram of the connection similar to that of FIG. 1, which is made to take care of an imbalance of heat flows in the two sides of the Vapor-Reheat Ladder. (These may be most noticeable with variation of either of the two recycle ratios.) Here a larger amount of cooled distillate may be circulated to condense the vapors formed in the vaporization compartments of the stages. Since this may not be practical, as an immediate adjustment less sea water must be vaporized than is required in the heat exchanger to remove the heat from the fresh water from the top stage. Here, again, normal practice would be to discharge some of the preheated sea water just before it enters the prime heater, and a dotted valved connection for such heat reject is indicated by the line 20 and the valved exhaust 21.

Again, however, by by-passing around the prime heater and the top stage or several stages, as shown by line 20 and alternate valved inlets 22, a fraction of the stream of preheated sea water (at most 10% to 20%, and usually not more than 2 to 8%), the preferred method of removing this heat has been found which secures smooth control and utilizes all available heat most advantageously at the highest possible temperature, by-passing the fractional stream to that stage where the temperature is just lower. The point of most effective entrance to the ladder of this stream by-passed from the main stream of sea water pre-heated in the heat exchanger has been found to be from the second to the tenth flasher from the top, depending on the temperature range of the operation and the number of stages.

Alternately, there may be a low temperature or auxiliary heat exchanger 25 which chills the recycle stream of fresh water by another stream of sea water 33 which is discharged to waste through line 34 with no attempt to recover the heat added thereto. This is shown by the dotted lines in the upper right of FIGURE 2, and it will cool the cyclic stream of fresh water to a temperature approaching that of the raw sea water. This represents a heat loss near the lowest temperature reached in the system, but the loss in heat is important in increasing the heat requirements per unit of product.

A similar arrangement with an auxiliary heat exchanger could be used in the case of the standard multiflash unit of FIGURE 1, but this is not shown. A part of the concentrated sea water is usually recycled to the sea water inlet, as above mentioned. This case also represents an auxiliary heat exchanger. It may be used alternately to the by-pass of the stream around the prime heater as described above; but it wastes heat. There is indicated, however, in FIGURE 1, by the heavy dashed line 15 at the lower right, the common means of Heat Reject (and waste) for the multi-flash system, wherein a part of the sea water feed is discharged after the lowest several stages.

This use of excess heat in the sea water required for the right or condensation-heating side of the ladder, which otherwise would have to be rejected and wasted, by the passage of a stream to a flash vaporization compartment somewhat below the top, may be equally effective with each of these different modifications. In practice, it allows the full use of the heat available by feeding it back to the system at the highest temperature at which it is available, and then compounding its effectiveness down to the lowest temperature at which it is usable.

Thus, as an example, exhaustive studies have shown that in the use of the Vapor-Reheat system with 10 stages, an inlet stream of sea water from the prime heater to the top stage, at 300° F., an inlet of chilled fresh water distillate to the bottom stage at 60° F., and a sea water temperature of 55° F., a change of only 10% in either direction from the optimum ratio of distillate recycled to sea water feed gave an increase in heat consumption per gallon of product water of almost 50%. (This indicates the care necessary and the instrumentation required in operating such a system.) This increase in heat requirements represents the amount of heat which might be rejected in such an exceptional use. However, by diverting the flow to the next to the top stage the increase in heat requirements (heat lost) over the minimum possible recycle ratio was only 5%. Such operations may be controlled quite automatically with simple thermostats and flow controllers.

When optimum values can be established for the variables, and then maintained by exact control, this heat loss will disappear. In practice, the average usual loss is from 10% to 20% of the theoretical minimum; and by control in the manner indicated, it may be reduced to 2% to 3%.

*Liquid-liquid-liquid heat exchanger—As used in vapor reheat method*

Another method of heat exchange, as shown in FIG. 3, with vessels 40 and 41 interconnecting circuits 54 and 55, also by direct contacting of fluids, has been the heating of one process aqueous stream by the cooling of another aqueous stream, through the use of an intermediate water-insoluble liquid as a heat carrier. Previously, there has been used as the heat carrier a petroleum fraction: gasoline, naphtha, or heavier oil, depending on the temperatures of the liquids involved. The oil (as it will be called) circulated in line 55 is heated in vessel or tower 41 by being intimately and counter-currently contacted with the hot, aqueous stream circulating in line 29, which is thereby cooled. Then the heated oil leaving 41 by line 54 is cooled by being intimately and counter-currently contacted in vessel or tower 40 with the cold, aqueous stream which is thereby being heated; and the oil recycles time and again through the circuit 55–41–54–40–55, etc. as a carrier of heat from the hot aqueous stream and to the cold aqueous stream. Almost complete mutual immiscibility of the oil stream with the aqueous streams and with any salts dissolved in one of them prevents contamination of one aqueous stream by the other through interchange through the oil. Also, there is possible a complete separation of each liquid phase. Paraffin hydrocarbon fractions of high purity and with a boiling point above the operating temperatures, have usually been used.

Usually the two halves of the operation are conducted in separate vessels; in some cases both steps are combined in one tower, with the oil entering the bottom and contacting the two aqueous streams in sequence as it rises to the top. This is diagrammed in U.S. Patent 3,250,081.

FIG. 3 diagrams one form of the liquid-liquid-liquid heat exchanger which may be used. It is made up of two vessels or towers 40 and 41 of the same type of equipment as liquid-liquid extractors of the "open tube" or "droplet" type. It may also be made up of other more complicated and expensive types of counter-current liquid-liquid contactors, e.g., that described in Othmer, U.S. Patent 2,000,606, and modifications thereof, the R.D.C. type, the York-Scheibel type, etc., also any other type of tower with packing or other internals suitable for liquid extraction.

*Flash chilling of hot condensate stream—As used in vapor reheat method*

The hot condensate stream leaving the top stage at pressure P′ on the right side 11 of the Vapor Reheat ladder without the Half-Stage of FIGURE 2, may be passed to a vessel at a lower pressure to allow a partial flash evaporation. Vapors so formed may be condensed, suitably on tubes carrying the inlet sea water, to give a condensate which is then twice-distilled water. This flash evaporation and condensation would take the place of the Heat Exchanger of FIGURES 1, 2 or 3.

In the co-pending application No. 241,721 of Dec. 3, 1962 there is described an improvement of this method of heat exchanging using very similar operations to those being discussed. The hot condensate coming from the top stage or the Half-Stage, may be cooled by several or more flash evaporations in a second series of stages. The vapors are passed to the other side of the respective stages of this second series, to be condensed on tubes passing through the stages carrying the inlet feed of sea water (after being suitably deaerated if desired by standard processes). The feed, in tubes, is thus preheated by vapors condensing on the outside of the tubes, as in the usual multiflash evaporator. Instead, in this case, the vapors are from a stream of hot distilled water being cooled by flash evaporation.

The condensate from this flash heat exchanger, i.e., the second series of stages, is thus "double-distilled" water; and its purity is higher than that from any single evaporation. Water of such high purity may thus be separated as the product. Its amount will approximate the flash evaporation of the sea water itself, in the other series of stages. This condensate of the second series of stages may be allowed to return to the original stream of the hot volatile liquid being cooled in each stage, as discussed in the co-pending application. A part of this stream would then be withdrawn as the product, after cooling as described above for the other cases.

Also, since the temperature range of this second ladder of stages is that of the entire original ladder, except for the top stage, these two ladders may be combined physically into a series of stages having four streams with interconnecting vapor passages: (a) enclosed heating of sea water, (b) open flashing of sea water, (c) open condensation on cycling distillate, and (d) open flashing of cycling distillate.

This pre-heater for the sea water is designed to insure high velocities in the tubes preheating the sea water and low hold-up time. Thus, a minimum of time and opportunity is given for scale formation and growth on the heating surfaces.

*Submerged combustion*

So-called "submerged combustion" of either gaseous or liquid fuels is yet another type of heat exchange by direct contact of fluid streams, in this case the hot combustion gases and the sea water being heated. By burning a liquid or compressed gaseous fuel with compressed air under a liquid surface, the heat of the combustion is made available directly to the liquid. This has been used to give hot water or hot solution, or to evaporate corrosive or other solutions which are difficult to handle.

FIG. 3 diagrams a horizontal vessel fitted with an internal combustion chamber 60 supplied with fluid fuel through line 62, and air through line 63 under pressure supplied by compressors 64 and 65, respectively; also with a supply line 73, and discharge line 76 of sea water; also discharge means line 31 for combustion gases with more or less steam.

One accessory of this Submerged Combustion Heater is the Combustion Gas Cooler 68. This allows also the elimination of non-condensible gases from the feed sea water. Such gases will be forced out of the sea water as it is heated in the Submerged Combustion Boiler; and these gases will go off with the combustion gases and be cooled and discharged together through an expander 67 for recovering the energy of compression of the gases; thence from the system through line 75.

A part of the cold sea water fed to the system passes downwardly through the counter-current scrubber or Combustion Gas Cooler 68. This chills the products of combustion from the submerged combustion operation to the lowest possible temperature, in order to condense out the maximum of water vapor before discharge. The lowest available cooling medium is the inlet sea water. The Combustion Gas Cooler is a simple tower with flow of sea water down over packing or cascade trays, against the rising gas stream. Desirably it has a height equivalent to from 4 to 10 equilibrium units in counter-current. A small part of the entering, cold sea water condenses the water vapor associated with the mixture of non-condensible gases of the feed sea water and the combustion gases; principally carbon dioxide and nitrogen, so that they discharge at a temperature preferably not more than 20° F. above the raw sea water temperature, and saturated with moisture under those conditions. These cooled gases, preferably after an expansion in an expander 75 which recovers the energy required for compression of the air and gaseous fuel (if such is used), may then be passed to any external use, if use there be for this gas mixture.

A greater number of moles of carbon dioxide is produced from most gaseous fuels than the number of moles of the fuel; and the nitrogen of the air and any unburned oxygen passes through without change. Hence, there may be recovered most or all of the energy required for compression of fuel gas and air since there is a larger number of moles of gas at the higher pressure to be expanded than the amount of gas at the lower pressure to be compressed (both throughout the same range). This may be done by a system of three cylinders on a common piston rod as indicated in FIG. 3, with the expansion energy of the Combustion gases in the Expander or right cylinder serving to drive the pistons in the two left cylinders or Compressors for compressing the fuel gas and the air for combustion to the higher pressure required for the combustion under the liquid. Alternately, a turbine may be driven by the expanding combustion gases, this turbine being on the drive shaft for two turbine blowers, one for air, and one for fuel gas. In either case, a motor or other prime mover would be connected to the mechanical system, for start-up, or make-up of energy when required.

*Combined novel thermodynamic process*

It has been found possible to combine several elementary systems and units for direct heat transfer between various streams of liquids and gases into an advantageous and efficient arrangement of method and equipment for accomplishing the production of pure distilled water from sea water. When done properly, this gives certain novel and unexpected advantages, including the production of potable water at a lower equipment cost and a lower cost for heat and total operating costs than required by other systems.

Suitable apparatus for accomplishing this Vapor-Reheat Process of the present invention includes normal components of processing equipment such as standard pumps and vessels, more recently developed liquid-liquid-liquid or other heat exchangers, modified submerged combustion evaporation equipment, a counter-current gas-liquid contactor, jets, sprays, piping, gas compressors, and expanding gas turbines, etc. Insofar as these are standard parts or tools known to the art they are not novel, the pertinent present development and invention is the combination of these steps, items of equipment, and methods in a novel form which obtains substantial and unexpected advantages and allows a maximum of thermodynamic efficiency with a minimum of plant cost and operating cost for the production of distilled water from saline water, as will hereinafter be described.

The same equipment, processes, and techniques may also be used advantageously in some other process industries—concentration of pulping liquors and the concentration by evaporation of other solutions; but the principal use will be in production of rather large amounts of potable water from saline and brackish waters. It is also most useful for the production of pure water from sewage and other waste water from various effluents.

Furthermore, the Method of Cooling Volatile Liquids of the co-pending application No. 241,721 of Dec. 3, 1962 may be used as the heat exchanger to produce a purer product and to secure other advantages.

*Combined flow sheet of vapor reheat process*

FIG. 3 is a diagrammatic flow sheet representation of the process wherein a ladder of nine stages of Vapor-Reheat operation is indicated, each stage being enclosed in a pressure-tight container. Each stage is a two compartment space, interconnected for vapor passage from left to right. This may be embodied in separate vessels with interconnecting piping allowing vapor passage from the flash evaporator to the flash condenser. Alternately, each stage may be a cross-sectional part of a single vessel; and this design has often been used as the construction method—usually horizontally disposed—for the series of stages in a multiple effect flash evaporation unit. The wall dividing such stages is then under only the slight differential pressure existing between the two stages. A cheaper construction is thus obtained since all walls of the stage do not have to be sufficiently strong to withstand the total internal pressure. Also, piping is simplified between stages. Often in the past practice with usual multiflash evaporators, a single horizontal vessel has been used for a multiplicity of stages. However, a vertical vessel with stages built like plates in a distilling tower has been found to have advantages. There is a simple baffle to keep the liquid streams apart in the two separate compartments of the pressure tight container; but free movement of vapors is possible horizontally above the baffle. Such an arrangement is shown in FIG. 3.

Hot sea water passes downwardly on the left side 10 from the top or highest pressure stage. It flashes on each successively lower pressure stage to give vapors, which pass across each stage of the ladder. These condense to reheat the distillate which is cycled counter-currently. The hot sea water enters the left side of a stage designed to expose a maximum of liquid surface so as to contact effectively and to come to equilibrium with the vapors at the prevailing pressure of the stage. The downwardly pointing arrows may indicate sprays of sea water to give large water surfaces for contact with the vapors. The droplets may almost literally explode due to the higher internal vapor pressure when sprayed into the lower pressure for flash vaporization. Alternately, thin layers of liquid on one or more trays, or as descending films, also may be used to increase the surface of the flashing liquid. Many arrangements of cascading liquid have been used from trays inside the stage; these give large areas and thus promote ready evaporation and the attainment of equilibrium between the liquid and the vapor phases.

The surface for evaporation does not need to be large compared to the normal heat transfer surface utilizing metallic surfaces. It may be obtained by baffles or horizontal surfaces with overflow films trickling downwardly; and the exact method is not the important part of this invention. One suitable method uses horizontal overflow surfaces; another uses liquid sprays with a relatively low pressure drop obtained with relatively large ports for liquid passage and moderate velocities of liquid. Only a small amount of time is required for a very close approach to equilibrium; hence, a very small hold-up of sea water in the stage is necessary.

Two pressures: (a) the gravity head of each stage superimposed above the next lower one, and (b) the difference of vapor pressure pertaining, cause the flow of sea water downward on the left side through the sprays or other systems which may be used. Float valves (not shown) may be arranged to control the flow and maintain a level of sea water in a shallow body on its part of the tray. Alternately, other forms of trap valves such as any one of many types of standard steam traps may be used to allow outflow of sea water from a stage to be regulated so as not to allow vapors to pass, but to balance the inflow. Among such devices which may be used for this control purpose are the so-called "thermodynamic" traps commercially available. By a "floating" disc or suitably designed labyrinth passage these traps stop vapor passage but allow liquid to flow readily due to the pressure gradient from stage to stage.

In the case of the cold distillate (previously produced pure water) circulated to each stage, progressively higher than the previous one in pressure and often, as in these figures, in elevation also, this also requires liquid-vapor surface. Somewhat more surface has been found to be necessary than in the evaporating surface for the same amount of heat transfer, particularly if there are non-condensible gases which have not been removed. Even more desirable here it is to have a maximum liquid surface in contact with the vapor to permit thermal equilibrium to be obtained by condensation of vapors, and heating of the distillate successively from stage to the next higher stage. Here again, for the purpose of this diagram, overflowing horizontal surfaces may be assumed to give the necessary area for contact of vapors and condensation, although in practice, sprays allowing greater amounts of liquid per unit volume are usually preferred.

Each stage of the ladder is provided with a barrier or baffle system to prevent sea water mixing with fresh water—or vice versa—without interfering with free vapor passage from left to right. Obviously, these two sides of the ladder may be in two separate spaces, or even separate vessels, with vapor piping in between; and this may be desirable in very large units. The effect would be the same, except that the vapor piping is then designed to minimize friction losses, and accompanying pressure losses, with concomitant temperature losses for effecting heat transfer.

Recycle or "reflux" of a part—up to 50% or 60% or even more of the concentrated sea water discharged from the lowest stage back to the sea water inlet, has been found to save the heat in this discharge which is available above the temperature of raw sea water. However, for simplicity in this and other figures, the necessary connection is not shown.

The fresh water distillate is cycled from the lowest pressure stage, the bottom one in FIG. 3 to the top or high pressure stage and thence through a heat exchanger and back to the lowest pressure stage. On each stage, the level of distillate may be maintained constant by a float valve (not shown) which opens as the liquid rises. The transfer of liquid to the next higher stage may be done by the series of centrifugal or other pumps 31 shown to the right of the Flash Condensers. The volume of the condensation is increased by the condensate in each stage; and a part of the distillate is continuously withdrawn, equal to the increment of one cycle. This is the product, fresh water, for discharge through line 26—out of the system.

In the Vapor Reheat system of multiple stages, the two liquid streams are flowing in counter-current. By arrangement of the stages in a vertical system (and single external shell of vessel preferably) one liquid stream may be allowed to flow downwardly from stage to stage by gravity. If this is the sea water stream, the vapor pressure differential pressure assists the movement. Since a relatively smaller subdivision of fresh water is required for attainment of condensation on the distillate side, the sea water has been allowed usually to flow downwardly from one higher stage to the next lower stage without mechanical assistance by pumps. In normal pressure ranges, and with the large number of stages required, it has been found desirable or necessary to force the recycling distillate upwardly from stage to stage by means of a pump between each stage. This, then, adds four increments of pressure required by:

(a) elevation and gravity
(b) higher vapor pressure
(c) mechanical energy required to break up water into other forms with correspondingly great increase of surface, and
(d) pipe friction.

The sea water, under pressure at least as high as its saturation pressure under the highest temperature encountered, is preheated before entering the top pressure stage. The heat exchanger suggested in co-pending application 241,721 of Dec. 3, 1962 has advantages over a usual tubular type. Also may be used a liquid-liquid-liquid combination as diagramed in FIGURE 3 or in a single shell as mentioned above.

Preheated sea water passes to a prime heater wherein there may be a submerged combustion of fuel gas or liquid as described above.

If fuel oil is used instead of fuel gas, it is pumped into the submerged combustion system under the necessary pressure for atomization in the submerged combustion chamber. The cold sea water is also supplied—to both the heat exchanger and the combustion gas cooler—under this same high pressure P of the prime heater. The hot distillate leaving the top stage of the Vapor-Reheat ladder also is pumped up to this somewhat higher pressure. Thus, all the system in FIGURE 3 to the left of the evaporator-condenser unit is at this pressure P somewhat above that of the top stage.

*Flow sheet using half-stage with submerged combustion*

In the operation of the Submerged Combustion Heater of FIGURE 3, the discharged mixture of combustion gases and steam is at the high temperature and pressure of the heated sea water going to the top flasher. There is the usual difference between this temperature and that of the distillate water leaving the top flasher.

However, since the gases must be removed, and they necessarily carry with them the corresponding amount of steam, this may be utilized, as indicated above, in preheating the raw sea water coming into the system. More heat is available than necessary for this preheating of the feed, so most of the entering sea water passes through the Heat Exchanger. In any case, this preheating of feed is a relatively uneconomic use of the latent heat of the steam carried with the combustion gases since it is used mainly to add heat at a much lower temperature than that of the Prime Heater.

It has now been found that this mixture of combustion gases and steam can be used to heat the distillate leaving the Vapor Reheat ladder to a temperature above that of the top stage. The distillate will then pass to the Heat Exchanger at a correspondingly higher temperature. If the temperature of approach in the Heat Exchanger of entering sea water to that of the hot distillate is fixed, as it well may be, there is then obtained a higher temperature of sea water entering the Prime Heater. This reduces correspondingly the heat requirement in the Prime Heater; and thus increases the efficiency (and capacity) of the unit as a whole to give a lower heat cost per unit of distillate produced.

FIG. 3 diagrams one means of taking advantage of this heat in the Combustion Gas-Steam mixture, by a Half-Stage 19 added to the top of the Vapor Reheat ladder. The combustion gases from the Heater are passed through a Half-Stage; in this case an entirely separate vessel 19, on their way to the bottom of the Combustion Gas Cooler 68. The distillate liquid from the top stage of the ladder is passed into this Half-Stage to obtain intimate heat transfer relation in the same way as in the other stages, i.e., by spraying, falling films, etc. The distillate is heated further, more pure water is added by condensation (as in the regular stages of the ladder)—then it is passed to the Heat Exchanger, in this flow sheet the liquid-liquid-liquid heat exchanger of vessels 40 and 41 and connecting lines 54 and 55.

In some cases, the Half-Stage may be located on top of the main ladder as indicated in FIGURES 1 and 2. Suitable connections are then provided for vapor and liquid flows. The vapor discharge, however, goes to the Gas Combustion Cooler when Submerged Combustion is used.

Heat Transfer is relatively poorer in the presence of the large amount of non-condensible gases. Hence, the Half-Stage with submerged combustion may be much larger than the corresponding part of a regular stage; and the volume of the Half-Stage may well be the size and volume of any other complete stage, i.e., the physical allotment of space may be that of one more complete stage above the top full stage.

While this Half-Stage has been found to be especially useful in increasing the efficiency of the system when using a Submerged Combustion Heater, because of the steam passing off with the non-condensibles, the same techniques has been found to reduce steam consumption when an ordinary Prime Heater with heat transfer surface is used. Practically pure steam is obtained then, plus any small amount of non-condensible gases in the raw sea water which have not been eliminated in the heating by the Heat Exchanger. There is the same reason as before for the heat economy in more efficient utilization. Thus, the Prime Heater has become, in effect, also a simple evaporator to the extent that it furnishes as much steam as is required to bring the distillate from its temperature leaving the stop stage (in substantial equilibrium with the pressure there) up to the temperature of pure distillate in equilibrium with the vapors formed in the Prime Heater.

In each of the usual stages of the Vapor Reheat ladder, the temperature of the distillate leaving is in substantial equilibrium with the vapor pressure there, which is substantially that of the sea water leaving its side of the stage. (A slight elevation of boiling point has to be considered in giving numerical values.) If the amount of sea water entering the stage is equal to the amount of distillate entering; and if elevation of boiling point is neglected, the temperature fall of the sea water will be about the same as the temperature rise of the distillate, i.e., each is about one half of the difference of temperature between entering sea water and entering distillate. Under these conditions, idealized for the purpose of the present illustration, the distillate has a temperature of approach to that of the entering brine of about one half of the overall difference of the stage, on either side. (In an ordinary Multi-Flash Evaporator, there will be a greater difference or temperature of approach because of the added resistance of the metallic heat transfer surface.)

However, when using a Half-Stage above the regular Vapor Reheat ladder, and whether using a Heater supplied with a Submerged Combustion unit or a standard steam heating coil, when evaporation is accomplished to maintain the corresponding pressure in the Half-Stage, then the exit temperature of the distillate may be brought up practically to that of the liquid leaving the Prime Heater (except for any existing boiling point elevation). This heat supply to the distillate, which then by the action of the Heat Exchanger raises the temperature of the entering sea water accordingly, is done by the same amount of heat input to the Heater as would be required if the brine had not had the additional temperature increment in the Heater Exchanger.

However, the use of the Half-Stage requires no less heat, but gives an additional amount of fresh water distillate equivalent to the evaporation in the Prime Heater. This improves correspondingly the amount of product and the heat efficiency of the Vapor Reheat process as a whole, by 5% to 20%.

Similarly, the thermal efficiency of the usual Multi-Flash Evaporator is improved by the addition of a Half-Stage (whether or not there is used a Submerged Combustion Heater). In this case, the Half-Stage is one more Condenser-Heater superimposed on the usual series; and this added Condenser-Heater is supplied by Vapors from the Heater, which, in turn, may be supplied with prime heat entering the system either by submerged combustion, a steam coil, or otherwise.

While in practice it is desirable to deaerate the feed sea water by any of the usual systems or simultaneously with the removal of combustion gases from a submerged combustion heater, some additional provision must also be made on each stage. The vents shown in FIGURE 3 allow the removal of non-condensible gas coming from any source in each stage.

Each vent is merely a short, valved pipe of small diameter with ends connected into the vapor spaces of adjacent condensation compartments. The valves and pressure differences allow venting of the gas mixed with some vapor from each compartment to that of the next lower pressure. Finally, the vent discharges from the lowest pressure compartment to a vacuum pump, as shown, or to the atmosphere, if the last pressure stage is at or above atmospheric pressure.

FIGURE 3 diagrams and exemplifies one combination of the unitary systems or operations comprising this improved Vapor-Reheat method for desalinating sea water; and it does not indicate all of the features or necessarily the best combination of them, particularly when the requirements of different situation may be considered. Thus, it does not indicate the recycle or "reflux" of concentrated sea water back to the inlet of raw sea water to take advantage of the higher temperature of the effluent stream and thus economize up to 20% or more of the amount of heat required in the prime heater. (This economy is larger for a small number of stages, and for less high temperatures of inlet sea water to the top of the Vapor-Reheat ladder of stages.)

Neither is there shown in FIGURE 3 the system for control of the balance of the system to prevent "heat reject," through by-passing a part of the entering sea water around the prime heater to a stage slightly below the top one, as shown in FIGURE 2. While such loss of heat is not necessary when proper controls are established and maintained for optimum conditions, it might normally represent an average loss of 20% from optimum operation. This system will reduce it to an average of 2 to 3%.

Although FIGURE 3 indicates the use of a liquid-liquid-liquid heat exchanger, advantage may be taken instead of the new Method of Cooling Volatile Liquids of co-pending application No. 241,721 of Dec. 3, 1962, particularly if an especially pure water, twice distilled, is desired as the product. This system produces the twice-distilled product at no additional heat charge compared to the usual single-distilled product.

The several features of this invention, as described above, and discussed in relation to the Vapor Reheat system of multi-flash evaporation are applicable also to the usual type of multi-flash evaporation (except for those concerned with heat exchanging to cool the heated distillate stream). No combined drawings similar to FIGURE 3 are necessary to understanding the analogous flow sheets.

I claim:
1. In the system of flash evaporation of an original aqueous solution to produce fresh water substantially free of solute, the process which comprises the following steps:
 (a) heating the said original aqueous solution to the highest temperature it encounters in the system in a prime heater where heat is supplied from an external source at the highest temperature in the system;
 (b) boiling in the prime heater some part of the water present in the original solution, to give fresh water vapors, the heat for said boiling being supplied by said external source;
 (c) passing the said original solution directly after said heating and said partial evaporation into plural stages at successively lower pressures and boiling point temperatures, corresponding to the respective pressure reduced from that at the discharge of the said prime heater, to vaporize an additional part of the water in the original solution and to obtain additional fresh water vapors in the respective plural stages;
 (d) directing the said additional fresh water vapor formed in the respective stages to respective condensing zones of said stages;
 (e) passing an aqueous stream at a relatively lower temperature through the respective condensing zones in counterflow relationship to the flow of original aqueous solution passing through the stages;
 (f) condensing the additional fresh water vapors formed in the respective stages to heat the aqueous stream at a relatively lower temperature in each of the respective condensing zones;
 (g) condensing the said fresh water vapors produced in the prime heater in a condensing zone, the condensing taking place at a higher temperature and pressure than the condensing conditions of temperature and pressure in any condensing zone of any of the said plural stages, while heating the said aqueous stream at a relatively lower temperature; and
 (h) withdrawing from the system an amount of fresh water which is approximately equal to the total of the amount of fresh water vapors formed in the prime heater and the additional fresh water vapors formed in the respective plural stages.

2. In the system of claim 1, wherein the said aqueous stream which is at a relatively lower temperature as it is being passed through the respective condensing zones of said plural stages and the condensing zone at a higher temperature and pressure, is the original aqueous solution;

and said passage through the respective condensing zones is through closed channels, on the surfaces of which the said fresh water vapors formed in the said prime heater and the said additional fresh water vapors formed in the said plural stages are being condensed to heat the said original aqueous solution which, in this step, is at a relatively lower temperature.

3. In the system of claim 1, wherein the said aqueous stream which is at a relatively lower temperature as it is being passed through the respective condensing zones of said plural stages and the condensing zone at a higher temperature and pressure is a stream of fresh water being maintained at temperatures below its boiling points at the pressures prevailing in the respective condensing zones;

said stream of fresh water being directly contacted with the said additional fresh water vapors formed in the respective plural stages to condense the additional fresh water vapors and to form a combined stream; and said combined stream of fresh water being passed to the said condensing zone at a higher temperature and pressure than that of any condensing zone of any of said plural stages, wherein the said fresh water vapors formed in the prime heater are condensed to heat the said combined stream; and said combined stream of fresh water leaving the said condensing zone at a higher temperature and pressure than that of any condensing zone of any of said plural stages is being passed to a counter-current liquid heat interchanging operation with the said original stream of aqueous solution which is heated thereby while said combined stream of fresh water is cooled thereby.

4. In the system of claim 3, wherein the said counter-current liquid heat exchanging operation comprises:
 (a) removing the said combined stream of fresh water heated by the said fresh water vapors produced in the prime heater from the said condensing zone at a higher temperature and pressure;
 (b) cooling said combined stream by a series of flash evaporations of condensate in a series of plural stages at successively lower pressures and temperatures, reduced from that at the discharge of the said condensing zone at a higher temperature and pressure;
 (c) vaporizing a part of the said combined stream of fresh water and obtaining fresh water vapor in the respective plural stages of the series of flash evaporations of condensate;
 (d) directing the said water vapor formed in the respective stages of the series of flash evaporations of condensate to the respective condensing zones of said stages, so that it may be condensed and caused to heat without direct contact with the said cooler original aqueous solution which is being circulated in closed channels through said condensing zones; and
 (e) withdrawing the condensate so formed in the plural stages of the series of flash evaporations of condensate as twice-distilled water.

5. In the system of claim 3, wherein the said counter-current liquid heat exchanging operation comprises:
 (a) removing the said combined stream of fresh water heated by the said fresh water vapors produced in the prime heater from the said condensing zone at a higher temperature and pressure;
 (b) cooling said combined stream of fresh water by contacting it directly in a counter-current, liquid-liquid relation with an intermediate cooler stream of a liquid, substantially water-insoluble, which is being heated thereby; and
 (c) cooling said stream of substantially water-insoluble liquid, after being so heated, by a direct liquid-liquid contacting with the said original aqueous solution, thereby heating said original aqueous solution.

6. In the system of claim 1, wherein the external heat supplied to the prime heater for heating the said original solution and evaporating some part of the water thereof comes from the burning of a fluid fuel under the surface of the original solution, the combustion product gases from said burning being in direct contact with the original solution and being passed with the vapors formed in said evaporation to said condensing zone at a higher temperature and pressure.

References Cited

UNITED STATES PATENTS

| 2,310,399 | 2/1943 | Cox et al. | 202—205 X |
| 2,514,944 | 7/1950 | Ferris et al. | 202—236 |
| 2,803,589 | 8/1957 | Thomas | 202—53 |
| 3,152,053 | 10/1964 | Lynam | 203—11 |
| 3,161,558 | 12/1964 | Pavelic et al. | 203—88 |
| 3,165,452 | 1/1965 | Williams | 202—53 |
| 3,214,348 | 10/1965 | Lichtenstein | 203—10 |

NORMAN YUDKOFF, *Primary Examiner.*

F. E. DRUMMOND, *Assistant Examiner.*